(12) United States Patent
Zhao (10) Patent No.: US 10,429,936 B2
(45) Date of Patent: Oct. 1, 2019

(54) REMOTE CONTROL METHOD AND SYSTEM FOR VIRTUAL OPERATING INTERFACE

(71) Applicant: SHENZHEN TCL NEW TECHNOLOGY CO., LTD, Shenzhen, Guangdong (CN)

(72) Inventor: Bo Zhao, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 506 days.

(21) Appl. No.: 15/125,134

(22) PCT Filed: Sep. 23, 2015

(86) PCT No.: PCT/CN2015/090466
§ 371 (c)(1),
(2) Date: Sep. 9, 2016

(87) PCT Pub. No.: WO2016/070688
PCT Pub. Date: May 12, 2016

(65) Prior Publication Data
US 2016/0378194 A1 Dec. 29, 2016

(30) Foreign Application Priority Data
Nov. 6, 2014 (CN) .......................... 2014 1 0620941

(51) Int. Cl.
*G06F 3/0481* (2013.01)
*G06F 3/01* (2006.01)
(Continued)

(52) U.S. Cl.
CPC .............. *G06F 3/017* (2013.01); *G06F 3/011* (2013.01); *G06F 3/0425* (2013.01);
(Continued)

(58) Field of Classification Search
CPC ...... G06F 3/017; G06F 3/0426; G06F 3/0482; G06F 3/0425; G06F 3/011;
(Continued)

(56) References Cited

U.S. PATENT DOCUMENTS

| | | | |
|---|---|---|---|
| 8,502,780 B1 * | 8/2013 | Park | G06F 3/04886 345/165 |
| 8,593,417 B2 * | 11/2013 | Kawashima | B60K 35/00 345/156 |

(Continued)

FOREIGN PATENT DOCUMENTS

| CN | 102780864 A | 11/2012 |
|---|---|---|
| CN | 103067766 A | 4/2013 |
| CN | 103428339 A | 12/2013 |

OTHER PUBLICATIONS

International Search Report of PCT Patent Application No. PCT/CN2015/090466 dated Dec. 30, 2015.

*Primary Examiner* — Anil K Bhargava (57) ABSTRACT

The present disclosure provides a remote control method for virtual operating interface including following steps. A voice command is obtained by the to-be-controlled terminal according to a voice signal input by a user, and the voice command is sent to a control terminal. A corresponding virtual operating interface is projected by the control terminal according to the voice command. A graphic image formed by the virtual operating interface is collected by the control terminal at each preset time interval. A remote command corresponding to a location within the virtual operating interface at which a fingertip of the user keeps operating is determined by the control terminal according to the collected graphic image, and the remote command is sent to the to-be-controlled terminal, thereby controlling the to-be-controlled terminal to perform corresponding remote operations.

6 Claims, 3 Drawing Sheets

(51) Int. Cl.
*G06F 3/16* (2006.01)
*G06K 9/00* (2006.01)
*G06F 3/042* (2006.01)
*G06F 3/0482* (2013.01)
*G08C 17/02* (2006.01)
*H04N 9/31* (2006.01)
*H04N 5/44* (2011.01)
*H04N 21/422* (2011.01)
*H04N 21/4223* (2011.01)

(52) U.S. Cl.
CPC .......... *G06F 3/0426* (2013.01); *G06F 3/0482* (2013.01); *G06F 3/04815* (2013.01); *G06F 3/167* (2013.01); *G06K 9/00355* (2013.01); *G06K 9/00389* (2013.01); *G08C 17/02* (2013.01); *H04N 9/3173* (2013.01); *H04N 9/3179* (2013.01); *G08C 2201/31* (2013.01); *H04N 5/4403* (2013.01); *H04N 21/4223* (2013.01); *H04N 21/42203* (2013.01); *H04N 21/42204* (2013.01); *H04N 21/42222* (2013.01); *H04N 2005/4428* (2013.01)

(58) Field of Classification Search
CPC ... G06F 3/04815; G06F 3/167; H04N 9/3179; H04N 9/3173; H04N 21/42204; H04N 21/42203; H04N 21/4223; H04N 21/42222; H04N 5/4403; H04N 2005/4428; G08C 17/02; G08C 2201/31; G06K 9/00389; G06K 9/00355
See application file for complete search history.

(56) References Cited

U.S. PATENT DOCUMENTS

| | | | | |
|---|---|---|---|---|
| 9,135,503 B2* | 9/2015 | Sundaresan | | G06F 3/017 |
| 9,223,402 B2* | 12/2015 | Cho | | G06F 3/017 |
| 9,304,598 B2* | 4/2016 | Hong | | G06K 9/00389 |
| 9,389,420 B2* | 7/2016 | Maciocci | | G06F 3/011 |
| 9,721,383 B1* | 8/2017 | Horowitz | | G06T 17/20 |
| 9,747,018 B2* | 8/2017 | Han | | G06F 3/017 |
| 10,140,011 B2* | 11/2018 | Anderson | | G06F 3/0488 |
| 2008/0273755 A1* | 11/2008 | Hildreth | | G06F 1/1626 382/103 |
| 2011/0074675 A1* | 3/2011 | Shiming | | G06F 3/017 345/158 |
| 2011/0138285 A1* | 6/2011 | Kuo | | G06F 3/017 715/727 |
| 2011/0175837 A1* | 7/2011 | Westerman | | G06F 3/038 345/173 |
| 2011/0234386 A1* | 9/2011 | Matsuda | | G06F 3/017 340/12.54 |
| 2012/0236025 A1* | 9/2012 | Jacobsen | | G06F 3/011 345/629 |
| 2012/0268376 A1* | 10/2012 | Bi | | G06F 3/0425 345/168 |
| 2013/0024197 A1* | 1/2013 | Jang | | G10L 15/22 704/246 |
| 2013/0069985 A1* | 3/2013 | Wong | | G02B 27/017 345/633 |
| 2013/0147686 A1* | 6/2013 | Clavin | | G06F 3/013 345/8 |
| 2013/0207963 A1* | 8/2013 | Stirbu | | G06F 3/011 345/419 |
| 2013/0342459 A1* | 12/2013 | Karakotsios | | G06F 3/0418 345/159 |
| 2014/0152531 A1* | 6/2014 | Murray | | G06F 1/1632 345/8 |
| 2014/0282239 A1* | 9/2014 | Locker | | G06F 3/0482 715/810 |
| 2016/0378194 A1* | 12/2016 | Zhao | | G06F 3/017 715/728 |

* cited by examiner

REMOTE CONTROL METHOD AND SYSTEM FOR VIRTUAL OPERATING INTERFACE

TECHNICAL FIELD

The subject matter relates to remote control, and particularly, to a remote control method and a remote control system for virtual operating interface.

DESCRIPTION OF RELATED ART

With the development of technology, and particularly the popularization and maturity of the technology of intelligent cloud and intelligent operating system (OS) and the rise up of more and more wearable devices, human-computer interaction are no longer limited to a single mode. For example, the interaction between human and television are no longer limited to remote control. Interaction methods like gesture controlling, voice controlling, or motion sensing are more and more popular. A conventional interaction mode focusing on remote control is usually realized by operating the mechanical buttons of a remote controller. However, the mechanical buttons are easily broken up and do not work anymore, thereby affecting the accuracy of the input of remote commands.

The above content is only used to help technicians to understand the technical solutions of the present disclosure, but not admit that it is the prior art.

BRIEF SUMMARY OF THE DISCLOSURE

A main object of the present disclosure is to improve the accuracy of the input of remote commands, and the flexibility of the input of remote commands.

To achieve that, the present disclosure provides a remote control method for virtual operating interface including following steps.

A to-be-controlled terminal obtains a preset voice command according to a voice signal input by the user and sends the voice command to a control terminal; wherein the voice command corresponds to a preset virtual operating interface;

The control terminal projects a corresponding virtual operating interface according to the voice command;

The control terminal collects a graphic image formed by the virtual operating interface at preset time intervals;

The control terminal determines a remote command corresponding to a location within the virtual operating interface at which a fingertip keeps operating according to the collected graphic image, and sends the remote command to the to-be-controlled terminal, thereby controlling the to-be-controlled terminal to perform the corresponding remote operations.

Preferably, the step of "the control terminal determines a remote command corresponding to a location within the virtual operating interface at which a fingertip keeps operating according to the collected graphic image, and sends the remote command to the to-be-controlled terminal, thereby controlling the to-be-controlled terminal to perform the corresponding remote operations" including following steps.

When a projecting device projects the virtual operating interface, the control terminal obtains the first frame of image of the virtual operating interface, and sets the first frame of image as a template image;

The control terminal determines whether an absolute difference between a pixel value of the graphic image formed by the virtual operating interface successively collected at preset time intervals and a pixel value of the template image is greater than a first preset value;

If yes, the control terminal extracts a fingertip image within the graphic image currently collected;

The control terminal determines a button value input at the virtual operating interface by the user according to the fingertip image;

The control terminal sends a remote command to the to-be-controlled terminal according to the button value, thereby controlling the to-be-controlled terminal to perform the corresponding remote operations.

Preferably, after the step of "the control terminal extracts the fingertip image within the graphic image currently collected" further including following steps.

The control terminal calculates an area of the currently fingertip image;

The control terminal determines whether the area of the fingertip image is greater than a maximum value of a preset range;

If yes, the control terminal obtains a curvature jumping point of the fingertip image according to a quasi-circular feature of the fingertip image, performing an image segmentation on the fingertip image according to the curvature jumping point to acquire a target image having a continuous arc, replacing the fingertip mage with the target image; and the step of "the control terminal determines the button value input at the virtual operating interface by the user according to the fingertip image" is repeated.

If no, the step of "the control terminal determines the button value input at the virtual operating interface by the user according to the fingertip image" is performed.

Preferably, the step of "the control terminal determines the button value input at the virtual operating interface by the user according to the fingertip image" further including following steps.

The control terminal determines the coordinate of a center point of the fingertip image;

The control terminal determines the button value input at the virtual operating interface by the user according to the coordinate of the center point.

Preferably, the step of "the control terminal projects a corresponding virtual operating interface according to the voice command" further including following steps.

The control terminal detects in real-time whether a moving distance of the control terminal is greater than a second preset value;

If yes, the step of "the control terminal projects a corresponding virtual operating interface according to the voice command" is repeated.

To achieve that, the present disclosure further provides a remote control system for virtual operating interface including a control terminal and a to-be-controlled terminal.

The to-be-controlled terminal is configured to obtain a preset voice command according to a voice signal input by the user and send the voice command to the control terminal; and the voice command is corresponding to a preset virtual operating interface;

The control terminal is configured to project a corresponding virtual operating interface according to the voice command, collect a graphic image formed by the virtual operating interface at preset time intervals; determine a remote command corresponding to a location within the virtual operating interface at which a fingertip keeps operating according to the collected graphic image, and send a remote command to the to-be-controlled terminal, thereby controlling the to-be-controlled terminal to perform the corresponding remote operations.

Preferably, when the projecting device projects the virtual operating interface, the control terminal is configured to obtain the first frame of image of the virtual operating interface, and set the first frame of image as a template image, and determine whether the absolute difference between the pixel value of the graphic image formed by the virtual operating interface collected at preset time intervals and the pixel value of the template image is greater than the first preset value; if yes, the control terminal is further configured to extract a fingertip image within the graphic image currently collected; determine a button value input at the virtual operating interface by the user according to the fingertip image; and send a remote command to the to-be-controlled terminal according to the button value, thereby controlling the to-be-controlled terminal to perform the corresponding remote operations.

Preferably, the control terminal is further configured to calculate the area of the fingertip image; determine whether the area of the fingertip image is greater than the maximum value of the preset range; if yes, the control terminal is further configured to obtain the curvature jumping point of the fingertip image according to the quasi-circular feature of the fingertip image, perform an image segmentation on the fingertip image according to the curvature jumping point to acquire a target image having a continuous arc, replace the fingertip mage with the target image; and determine the button value input at the virtual operating interface by the user according to the fingertip image; if no, the control terminal is further configured to determine the button value input at the virtual operating interface by the user according to the fingertip image.

Preferably, the control terminal is further configured to calculate the coordinate of the center point of the fingertip image; and determine the button value input at the virtual operating interface by the user according to the coordinate of the center point.

Preferably, the control terminal is configured to detect in real-time whether the moving distance of the control terminal is greater than the second preset value; when the moving distance of the control terminal is greater than the second preset value, the control terminal is further configured to project the corresponding virtual operating interface according to the voice command.

The present disclosure outputs the virtual operating interface via the control terminal, and collects the graphic image formed by the virtual operating interface at preset time intervals. Thereby, the control terminal can determine the remote command corresponding to the location within the virtual operating interface at which a fingertip keeps operating according to the collected graphic image, and send the remote command to the to-be-controlled terminal, thus realizing the remote command input. Since the present disclosure can input the remote command via the virtual operating interface, comparing to the prior art which inputs the remote command via mechanical buttons, the present disclosure can effectively prevent the mechanical buttons from being damaged and improve the accuracy of the input of remote command. Besides, since the remote command is input via the wearable device, the user can operate more conveniently, and the flexibility of the input of remote command is improved.

The technical solution of the present invention is hereinafter described in detail with reference to the accompanying drawings.

DETAILED DESCRIPTION

It should be appreciate that the embodiments described herein are only intended to illustrate, but not to limit the present disclosure.

Figure 1:
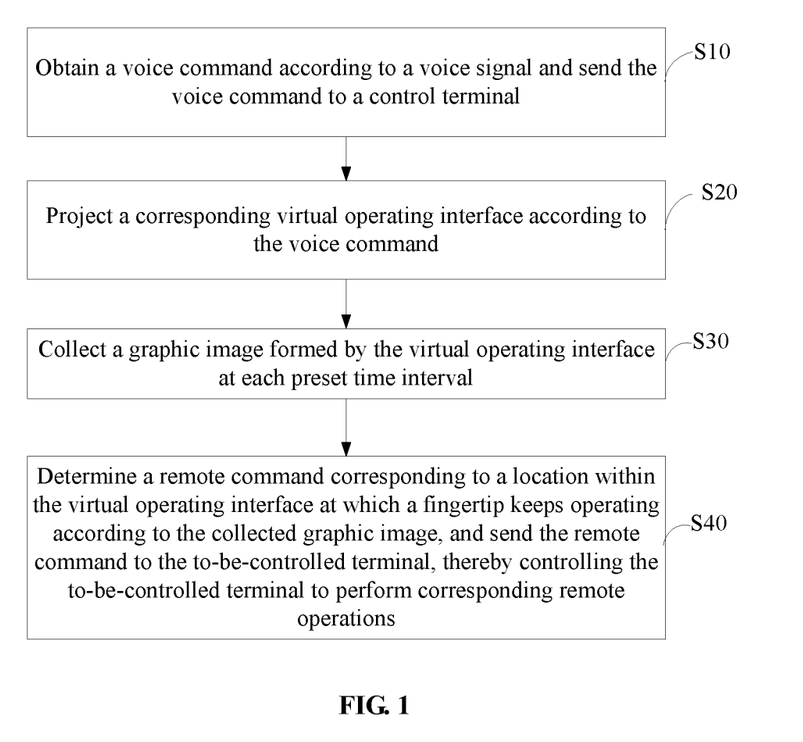
FIG. 1 is a flowchart of an embodiment of a remote control method for virtual operating interface.

The present disclosure provides an embodiment of a remote control method for virtual operating interface. Referring to FIG. 1, the remote control method for virtual operating interface includes following steps.

At step S10, the to-be-controlled terminal obtains a voice command according to a voice signal input by the user and sends the voice command to a control terminal. The voice command corresponds to a preset virtual operating interface.

In this embodiment, the virtual operating interface is mainly used in a remote control system, thereby allowing the remote commands to be input via the virtual operating interface. In the following embodiments, the to-be-controlled terminal is a remote control television system. In detail, the control terminal is a wearable device (such as eyeglasses), and the to-be-controlled terminal is an intelligent television which can establish a connection with the wearable device and communicate therewith. Each of the intelligent television and the wearable device has a voice input function. When the user opens the voice input function of the wearable device, the wearable device can receive a voice signal from the user and send the voice signal to the intelligent television. The user can also turn on the intelligent television to input the voice signal to the intelligent television. The virtual operating interface includes a digital remote projecting interface, a conventional remote operating interface, or a character keyboard projecting interface. The virtual operating interface is not limited thereto. The voice signal includes "switching on the digital remote projecting interface", "switching on the conventional remote operating interface", "switching on the character keyboard projecting interface", or an invaliding signal.

For example, when the user opens the voice input function of the control terminal, the control terminal sends the voice signal input by the user to the to-be-controlled terminal. When the to-be-controlled terminal receives the voice signal input by the user, the to-be-controlled terminal analyzes the voice signal, and matches the analyzed result and a voice command to obtain the corresponding voice command input by the user. The to-be-controlled terminal further sends the voice command to the control terminal. It is notable that when the to-be-controlled terminal receives the voice signal, the to-be-controlled terminal can further preprocess the voice/audio data of the voice signal. Preprocessing the voice/audio data includes processing the original voice signal, and filtering an unimportant signal and a background signal from the original voice signal. Preprocessing the voice/audio data can further include detecting endpoint, framing the voice signal, pre-emphasis, and so on, thereby reducing the difficulty of the voice signal analysis. The voice signal analysis can be realized via an existing voice signal analysis technology such as Hidden Markov Model (HMM), Dynamic Time Warping (DTW), Vector Quantization (VQ), Artificial Neural Network (ANN), and Support Vector Machine (SVM) which are well-known. The voice signal analysis can also be realized via other voice signal analyzing technologies.

At step S20, the control terminal projects a corresponding virtual operating interface according to the voice command.

At step S30, the control terminal collects a graphic image formed by the virtual operating interface at preset time intervals.

At step S40, the control terminal determines a remote command corresponding to a location within the virtual operating interface at which a fingertip keeps operating according to the collected graphic image, and sends the remote command to the to-be-controlled terminal, thereby controlling the to-be-controlled terminal to perform the corresponding remote operations.

In this embodiment, the control terminal is embedded with a projecting device which is configured to project the virtual operating interface. The control terminal is also embedded with an image capturing device (such as a camera) which is configured to collect the graphic image formed by the virtual operating interface. The preset time interval is an empiric value preset by the control terminal. The preset time interval can also be adjusted by the user.

In detail, when the control terminal receives the voice command from the to-be-controlled terminal, the control terminal projects the virtual operating interface corresponding to the voice command. For example, when the voice command is "switching on the digital remote projecting interface", the control terminal projects and displays the digital remote projecting interface. When the voice command is "switching on the character keyboard projecting interface", the control terminal projects and displays the character keyboard projecting interface. When the voice command is an "invaliding command", the control terminal projects and displays no interface, or projects and displays an empty virtual operating interface.

When virtual operating interface is projected and displayed, the camera embedded in the control terminal collects the graphic image formed by the virtual operating interface at preset time intervals. In detail, the size of the graphic image collected by the camera can be adjusted according to need. For example, the size of the graphic image collected by the camera can be the same as the size of the projected virtual operating interface, or can be larger than the size of the projected virtual operating interface. When in use, the projected virtual operating interface is within the capturing range of the camera.

When the fingertip of the user operates at the projected virtual operating interface to input the remote command, the control terminal can determine a corresponding fingertip image of the fingertip keeps operating at the virtual operating interface according to the collected graphic image, and determine a coordinate information of the virtual operating interface of the fingertip keeps operating at according to the fingertip image. The control terminal further determines the remote command according to the coordinate information, and sends the remote command to the to-be-controlled terminal, thereby controlling the to-be-controlled terminal to perform corresponding remote operations, and thus allowing the remote command to be input.

The present disclosure outputs the virtual operating interface via the control terminal, and collects the graphic image formed by the virtual operating interface at preset time intervals. Thereby, the control terminal can determine the remote command corresponding to the location within the virtual operating interface at which a fingertip keeps operating according to the collected graphic image, and send the remote command to the to-be-controlled terminal, thus allowing the remote command to be input. Since the present disclosure can input the remote command via the virtual operating interface, comparing to the prior art which inputs the remote command via mechanical buttons, the present disclosure can effectively prevent the mechanical buttons from being damaged and improve the accuracy of the input of remote command. Besides, since the remote command is input via the wearable device, the user can operate more conveniently, and the flexibility of the input of remote command is improved.

Figure 2:
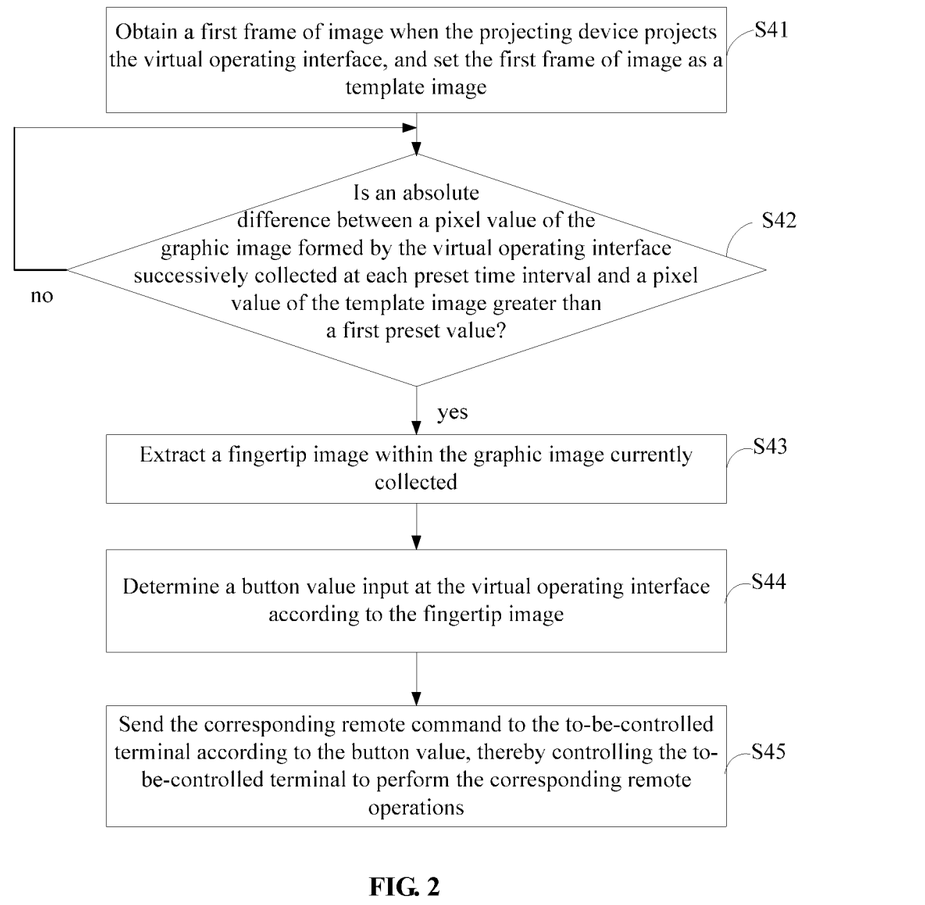
FIG. 2 is a sub-flowchart of an embodiment of the remote control method of FIG. 1 for recognizing a fingertip image.

Referring to FIG. 2, the present disclosure provides a second embodiment of a remote control method for virtual operating interface. The above step S40 further includes following steps.

At step S41, after the projecting device projects the virtual operating interface, the control terminal obtains the first frame of image of the virtual operating interface, and sets the first frame of image as a template image;

At step S42, the control terminal determines whether an absolute difference between a pixel value of the graphic image formed by the virtual operating interface successively collected at preset time intervals and a pixel value of the template image is greater than a first preset value. If yes, the procedure goes to step S43; otherwise, step S42 is repeated.

At step S43, the control terminal extracts a fingertip image within the graphic image currently collected.

At step S44, the control terminal determines a button value input at the virtual operating interface by the user according to the fingertip image.

At step S45, the control terminal sends a remote command to the to-be-controlled terminal according to the button value input, thereby controlling the to-be-controlled terminal to perform the corresponding remote operations.

It is notable that after the graphic image is collected, the graphic image can be optimized to improve a signal-to-noise ratio and to inhibit a background noise of the graphic image, thereby restoring a most real graphic image. In this embodiment, when the projecting device projects the virtual operating interface, the camera embedded in the control terminal obtains the first frame of image of the virtual operating interface, and sets the first frame of image as the template image. For example, the pixel value of the template image is denoted as $i_1(x, y)$. Then, the graphic images formed by the virtual operating image are successively collected at each time interval, and each of these graphic images is denoted as $i_n(x, y)$, wherein n denotes the frame number of the graphic images. For example, the pixel value of the second frame of image is denoted as $i_2(x, y)$. The pixel value of the template image corresponding to the first frame of image which is optimized is denoted as $A_1(x, y)$. The pixel value of the template image corresponding to an image after the first frame of image which is optimized is denoted as $A_n(x, y)$.

In detail, the optimizing of the graphic image includes correcting illumination, filtering noise from the graphic image, and processing gray of the graphic image. Correcting illumination means processing some varying information (such as illumination and angle) of the original graphic image via illumination correcting algorithm such as Gamma correction, non-linear variation of the image illumination, histogram equalization, and illumination compensation algorithm of the highest brightness point. The Gamma correction and the non-linear variation of the image illumination can non-linearly adjust the pixels of the graphic image to eliminate some irrelevant varying information of the original graphic image. The histogram equalization and illumination compensation algorithm of the highest brightness point can focus on adjusting the contrast ratio of the graphic image to improve the partial contrast ratio of the graphic image. The noise filtering algorithm mainly means filtering the noise in the original graphic image. The typical noise in the original graphic image includes Gaussian noise, salt and pepper noise, additive noise, and so on. The filtering method includes mean filtering, median filtering, and Gaussian filtering. The graphic image captured by the camera is a color image indicated by RGB tri-components. However, the RGB tri-components are highly relative to each other, which make it difficult and complicate to obtain the desired result. Since the following algorithm does not concern about the color information of the graphic image, the graphic image is grayed during the graphic image is preprocessed. The gray processing algorithm is denoted as a function $A'_n(x, y)=(A_{nR}(x, y)+A_{nG}(x, y)+A_{nB}(x, y))/3$ (1-1), wherein $A_{nR}$, $A_{nG}$, and $A_{nB}$ denote the RGB tri-components, respectively.

When the pixel values $A_1(x, y)$ and $A_n(x, y)$ of the graphic image after being optimized are obtained, the difference $B_n(x, y)$ between the pixel value of the graphic image currently captured and the pixel value of the template image is calculated according to a function $$B_n(x, y) = 255 \quad \text{if } (|A_n(x, y) - A_1(x, y)| > T_1)$$
$$B_n(x, y) = 0 \quad \text{else } (|A_n(x, y) - A_1(x, y)| \le T_1),$$

wherein $T_1$ denotes an empirical value (that is the first preset value). The function means that when each pixel of the "n" frame of image is similar to the pixel of the template image, the pixel value of the corresponding graphic image is set as "0". Otherwise, the pixel value of the corresponding graphic image is set as "255".

When the graphic image having $B_n(x, y)$ equaling to "255" is obtained, the morphology of the graphic image is further optimized. The optimizing algorithm of the morphology includes expansion algorithm, erosion algorithm, opening operation, and closing operation. The expansion algorithm is for discontinuous points. The erosion algorithm is for isolated points. The opening and closing operations are for both. Then, the fingertip image is extracted from the graphic image whose morphology is optimized. The button value input at the virtual operating interface by the user is determined according to the fingertip image.

Figure 3:
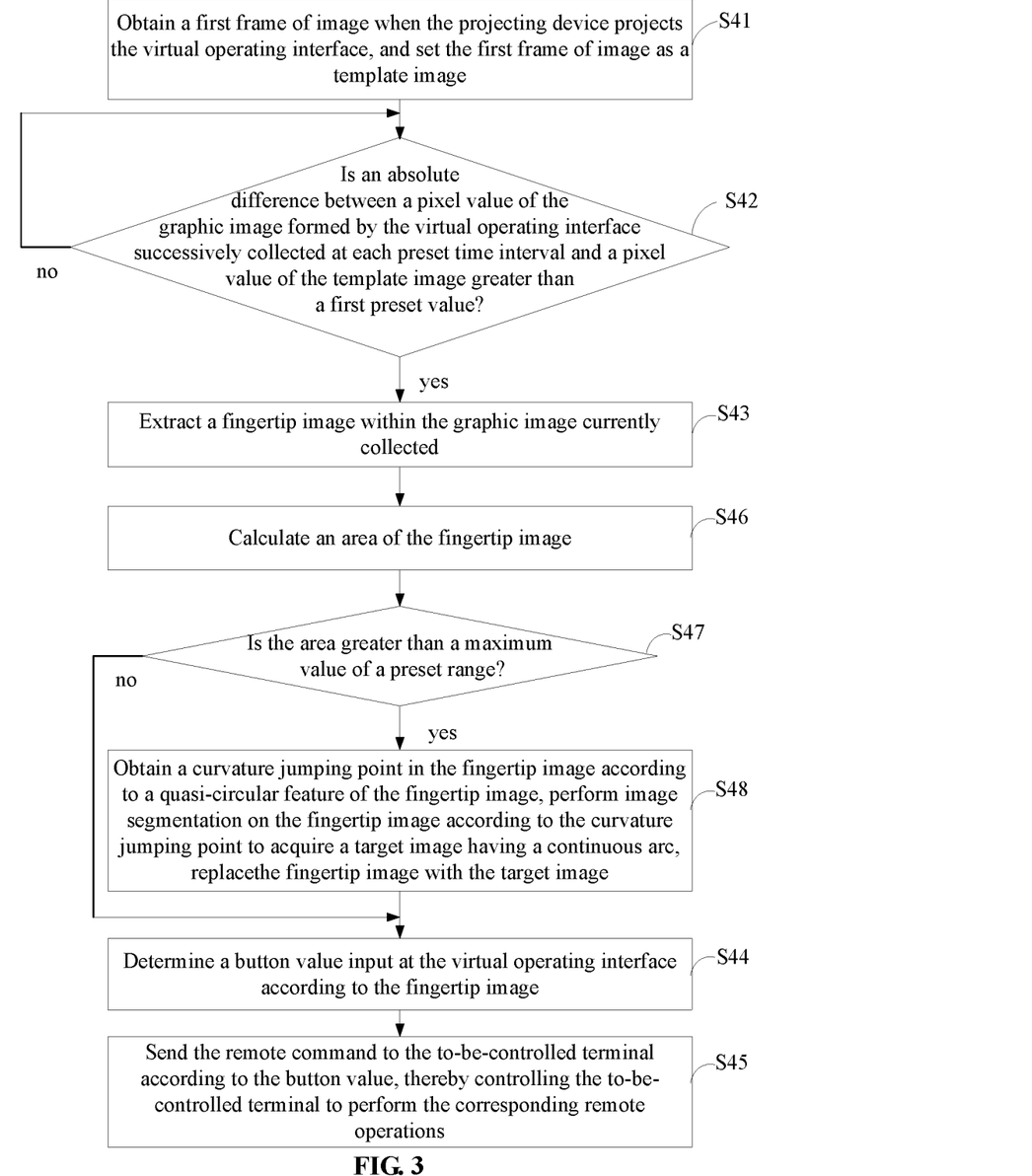
FIG. 3 is a sub-flowchart of another embodiment of the remote control method of FIG. 1 for recognizing the fingertip image.

Referring to FIG. 3, the present disclosure provides a third embodiment of a remote control method for virtual operating interface. The remote control method further includes following steps after the above step S43.

At step S46, an area of the fingertip image is calculated.

At step S47, whether the area of the fingertip image is greater than a maximum value of a preset range is determined. If yes, the procedure goes to step S48; otherwise, step S44 is repeated.

At step S48, a curvature jumping point of the fingertip image is obtained according to a quasi-circular feature of the fingertip image, the fingertip image is divided according to the curvature jumping point to acquire a target image having a continuous arc, the fingertip image is replaced with the target image. Then, step S44 is repeated.

In this embodiment, since the fingertips of different users may have different sizes, the number of the pixels of different fingertip images may thus be different. In the prior art, whether the fingertip image currently extracted is a single fingertip image is determined as follows. The number of the pixels of the fingertip image is calculated to determine the area of the fingertip image. When the number falls within a preset range, the fingertip image currently extracted is determined as a single fingertip image. When the number is greater than a maximum value of the preset range, the fingertip image currently extracted is determined to include not only a single fingertip image but also images of the finger. Then, the curvature jumping point of the fingertip image is obtained according to the quasi-circular feature of the fingertip image, the fingertip image is divided according to the curvature jumping point to acquire a target image having a continuous arc, the fingertip image is replaced with the target image. In this embodiment, since the effectiveness of the fingertip image is determined, the accuracy of the input of remote commands can be further improved.

It is notable that the way to determine the button value input at the virtual operating interface by the user according to the fingertip image can be varied according to need. For example, the button value input can be determined according to the coordinate of the center point of the fingertip image, and also can be determined according to the area covered by the whole fingertip image. In this embodiment, the control terminal first calculates the coordinate of the center point of the fingertip image, and determines the button value input at the virtual operating interface by the user according to the coordinate of the center point. For example, the coordinate of the center point of the fingertip image is denoted as $$(\overline{x_n}, \overline{y_n}), \overline{x_n} = \sum_{x \in R} i_n(x)/N, \overline{y_n} = \sum_{y \in R} i_n(y)/N,$$

wherein $i_n(x)$ and $i_n(y)$ denote the coordinates of the fingertip image along "x" axis and "y" axis, respectively, R denotes a coordinate collection (x, y) including coordinates within the fingertip image, and N denotes the number of the pixels of the fingertip image. The virtual button corresponding to the coordinate $(\overline{x_n}, \overline{y_n})$ is determined, and thus the button value input by the user is then determined.

Furthermore, in this embodiment, the remote control method further includes following steps after the above step S20.

The control terminal detects in real-time whether a moving distance of the control terminal is greater than a second preset value.

If yes, the step of control terminal projecting a corresponding virtual operating interface according to the voice command is repeated.

In this embodiment, when the projecting device projects the virtual operating interface, the control terminal turns off the camera and resets the projecting device if the control terminal moves. The control terminal can move an empirical distance (that is, the second preset value). Only when the user wearing the control terminal moves a distance greater than the empirical distance can the projecting device be reset, thereby preventing the control terminal from resetting the projecting device when the user only shakes slightly.

It is notable that the way the control terminal communicating with the to-be-controlled terminal can be varied according to need. For example the control terminal can wirelessly communicate with the to-be-controlled terminal via WiFi, Bluetooth, or 2.4G technology. In this embodiment, the control terminal communicates with the to-be-controlled terminal via Near Field Communication (NFC). During the NFC connection is established, the wireless communication currently used needs to be first determined. In the following examples, the control terminal is a wearable device, the to-be-controlled terminal is an intelligent television, and the wearable device and the intelligent television communicate with each other via Bluetooth and WiFi, respectively.

If the control terminal and the to-be-controlled terminal communicate with each other via Bluetooth, the control terminal first obtains the Bluetooth MAC address (BMacAddr) of the control terminal, and caches the BMacAddr via a memory thereof. When the user performs an touch operation (that is when the control terminal and the to-be-controlled terminal communicate with each other via P2P), the control terminal sends the BMacAddr to the to-be-controlled terminal via NFC (during the BMacAddr is sending, the control terminal determines whether feedback is received from the to-be-controlled terminal, and stops sending the BMacAddr until the feedback is received). The to-be-controlled terminal automatically adapts itself to the control terminal after receiving the BMacAddr via NFC, and establishes a Bluetooth connection with the to-be-controlled terminal.

If the control terminal and the to-be-controlled terminal communicate with each other via WiFi, since the control terminal has no human-computer interaction interface which makes it impossible to allow the user to manually connect the control terminal to WiFi network, the Service Set Identifier (SSID) and the security key required for WiFi network connection can only be obtained from the to-be-controlled terminal. Thus, during the WiFi network is connected, the to-be-controlled terminal needs to first obtain the SSID and the security key of the WiFi network which the to-be-controlled terminal is currently connected to. Of course, if the to-be-controlled terminal is not connected to any wireless network currently, the user may be reminded to connect the to-be-controlled terminal to a wireless network when the to-be-controlled terminal is initialized. When the SSID and the security key are obtained, the SSID and the security key are cached via a memory of the to-be-controlled terminal. When the user performs an touch operation (that is when the control terminal and the to-be-controlled terminal communicate with each other via P2P), the to-be-controlled terminal sends the SSID and the security key to the control terminal via NFC (during the SSID and the security key is sending, the to-be-controlled terminal determines whether feedback is received from the control terminal, and stops sending the SSID and the security key until the feedback is received). When the control terminal obtains the SSID and the security key via NFC, the control terminal adapts itself to the to-be-controlled terminal, thereby establishing a WiFi connection between the to-be-controlled terminal and the control terminal.

The present disclosure further provides an embodiment of a remote control system for virtual operating interface. The remote control system includes a control terminal and a to-be-controlled terminal.

The to-be-controlled terminal obtains a voice command according to a voice signal input by the user and sends the voice command to the control terminal. The voice command corresponds to a preset virtual operating interface.

In this embodiment, the virtual operating interface is mainly used in a remote control system, thereby allowing the remote commands to be input via the virtual operating interface. In the following embodiments, the to-be-controlled terminal is a remote control television system. In detail, the control terminal is a wearable device (such as eyeglasses), and the to-be-controlled terminal is an intelligent television which can establishes a connection with the wearable device and communicate therewith. Each of the intelligent television and the wearable device has a voice input function. When the user opens the voice input function, the wearable device can receive a voice signal from the user and send the voice signal to the intelligent television. The user can also turn on the intelligent television to input the voice signal to the intelligent television. The virtual operating interface includes a digital remote projecting interface, a conventional remote operating interface, or a character keyboard projecting interface. However, the virtual operating interface is not limited thereto. The voice signal includes "switching on the digital remote projecting interface", "switching on the conventional remote operating interface", "switching on the character keyboard projecting interface", or an invaliding signal.

For example, when the user opens the voice input function of the control terminal, the control terminal sends the voice signal input by the user to the to-be-controlled terminal. When the to-be-controlled terminal receives the voice signal input by the user, the to-be-controlled terminal analyzes the voice signal, and matches the analyzed result and a voice command to obtain the corresponding voice command input by the user. The to-be-controlled terminal further sends the voice command to the control terminal. It is notable that when the to-be-controlled terminal receives the voice signal, the to-be-controlled terminal can further preprocess the voice/audio data of the voice signal. Preprocessing the voice/audio data includes processing the original voice signal, and filtering the unimportant signal and background signal from the original voice signal. Preprocessing the voice/audio data can further include detecting endpoint, framing the voice signal, pre-emphasis, and so on, thereby reducing the difficulty of the voice signal analysis. The voice signal analysis can be realized via an existing voice signal analysis technology such as Hidden Markov Model (HMM), Dynamic Time Warping (DTW), Vector Quantization (VQ), Artificial Neural Network (ANN), and Support Vector Machine (SVM) which are well-known. The voice signal analysis can also be realized via other voice signal analyzing technologies.

The control terminal projects a corresponding virtual operating interface according to the voice command, collects a graphic image formed by the virtual operating interface at preset time intervals, determines a remote command corresponding to a location within the virtual operating interface at which a fingertip keeps operating according to the collected graphic image, and sends the remote command to the to-be-controlled terminal, thereby controlling the to-be-controlled terminal to perform the corresponding remote operations.

In this embodiment, the control terminal is embedded with a projecting device which is configured to project the virtual operating interface. The control terminal is also embedded with an image capturing device (such as a camera) which is configured to collect the graphic image formed by the virtual operating interface. The preset time interval is an empiric value preset by the control terminal. However, the preset time interval can be also adjusted by the user.

In detail, when the control terminal receives the voice command from the to-be-controlled terminal, the control terminal projects the virtual operating interface corresponding to the voice command. For example, when the voice command is "switching on the digital remote projecting interface", the control terminal projects and displays the digital remote projecting interface. When the voice command is "switching on the character keyboard projecting interface", the control terminal projects and displays the character keyboard projecting interface. When the voice command is an "invaliding command", the control terminal projects and displays no interface, or projects and displays an empty virtual operating interface.

When virtual operating interface is projected and displayed, the camera embedded in the control terminal collects the graphic image formed by the virtual operating interface at preset time intervals. In detail, the size of the graphic image collected by the camera can be adjusted according to need. For example, the size of the graphic image collected by the camera is the same as the size of the projected virtual operating interface, or is larger than the size of the projected virtual operating interface. When in use, the projected virtual operating interface is within the capturing range of the camera.

When the fingertip of the user operates at the projected virtual operating interface to input the remote command, the control terminal can determine the corresponding fingertip image according to the collected graphic image, and determine the coordinate information of the virtual operating interface of the fingertip keeps operating at according to the fingertip image. The control terminal further determines the remote command according to the coordinate information, and sends the remote command to the to-be-controlled terminal, thereby controlling the to-be-controlled terminal to perform corresponding remote operations, and thus allowing the remote command to be input.

The present disclosure outputs the virtual operating interface via the control terminal, and collects the graphic image formed by the virtual operating interface at preset time intervals. Thereby, the control terminal can determine the remote command corresponding to the location within the virtual operating interface at which a fingertip keeps operating according to the collected graphic image, and send the remote command to the to-be-controlled terminal, thus allowing the remote command to be input. Since the present disclosure can input the remote command via the virtual operating interface, comparing to the prior art which inputs the remote command via mechanical buttons, the present disclosure can effectively prevent the mechanical buttons from being damaged and improve the accuracy of the input of remote command. Besides, since the remote command is input via the wearable device, the user can operate more conveniently, and the flexibility of the input of remote command is improved.

In this embodiment, after the projecting device projects the virtual operating interface, the control terminal obtains the first frame of image of the virtual operating interface, and sets the first frame of image as a template image, determines whether an absolute difference between a pixel value of the graphic image formed by the virtual operating interface successively collected at preset time intervals and a pixel value of the template image is greater than a first preset value. If yes, the control terminal extracts a fingertip image within the graphic image currently collected, determines a button value input at the virtual operating interface by the user according to the fingertip image, and sends the remote command to the to-be-controlled terminal according to the button value input, thereby controlling the to-be-controlled terminal to perform the corresponding remote operations.

It is notable that after the graphic image are collected, the graphic image can be optimized to improve a signal-to-noise ratio and to inhibit a background noise of the graphic image, thereby restoring a most real graphic image. In this embodiment, when the projecting device projects the virtual operating interface, the camera embedded in the control terminal obtains the first frame of image of the virtual operating interface, and sets the first frame of image as the template image. For example, the pixel value of the template image is denoted as $i_1(x, y)$. Then, the graphic images formed by the virtual operating image are successively collected at each time interval, and each of these graphic images is denoted as $i_n(x, y)$, wherein n denotes the frame number of the graphic images. For example, the pixel value of the second frame of image is denoted as $i_2(x, y)$. The pixel value of the template image corresponding to the first frame of image which is optimized is denoted as $A_1(x, y)$. The pixel value of the template image corresponding to an image after the first frame of image which is optimized is denoted as $A_n(x, y)$.

In detail, the optimizing of the graphic image includes correcting illumination, filtering noise from the graphic image, and processing gray of the graphic image. Correcting illumination means processing some varying information (such as illumination and angle) of the original graphic image via illumination correcting algorithm such as Gamma correction, non-linear variation of the image illumination, histogram equalization, and illumination compensation algorithm of the highest brightness point. The Gamma correction and the non-linear variation of the image illumination can non-linearly adjust the pixels of the graphic image to eliminate some irrelevant varying information of the original graphic image. The histogram equalization and illumination compensation algorithm of the highest brightness point can focus on adjusting the contrast ratio of the graphic image to improve the partial contrast ratio of the graphic image. The noise filtering algorithm mainly means filtering the noise in the original graphic image. The typical noise in the original graphic image includes Gaussian noise, salt and pepper noise, additive noise, and so on. The filtering method includes mean filtering, median filtering, and Gaussian filtering. The graphic image captured by the camera is a color image indicated by RGB tri-components. However, the RGB tri-components are highly relative to each other, which make it difficult and complicate to obtain the desired result. Since the following algorithm does not concern about the color information of the graphic image, the graphic image is grayed during the graphic image is preprocessd. The gray processing algorithm is denoted as a function $A'_n(x, y)=(A_{nR}(x, y)+A_{nG}(x, y)+A_{nB}(x,y))/3$ (1-1), wherein $A_{nR}$, $A_{nG}$, and $A_{nB}$ denote the RGB tri-components, respectively.

When the pixel values $A_1(x, y)$ and $A_n(x, y)$ of the graphic image after being optimized are obtained, the difference $B_n(x, y)$ between the pixel value of the graphic image currently captured and the pixel value of the template image is calculated according to a function $$B_n(x, y) = 255 \quad \text{if } (|A_n(x, y) - A_1(x, y)| > T_1)$$
$$B_n(x, y) = 0 \quad \text{else } (|A_n(x, y) - A_1(x, y)| \le T_1)\text{,}$$

wherein $T_1$ denotes an empirical value (that is the first preset value). The function means that when each pixel of the "n" frame of image is similar to the pixel of the template image, the pixel value of the corresponding graphic image is set as "0". Otherwise, the pixel value of the corresponding graphic image is set as "255".

When the graphic image having $B_n(x, y)$ equaling to "255" is obtained, the morphology of the graphic image is further optimized. The optimizing algorithm of the morphology includes expansion algorithm, erosion algorithm, opening operation, and closing operation. The expansion algorithm is for discontinuous points. The erosion algorithm is for isolated points. The opening and closing operations are for both. Then, the fingertip image is extracted from the graphic image whose morphology is optimized. The button value input at the virtual operating interface by the user is determined according to the fingertip image.

The control terminal further calculates an area of the fingertip image, determines whether the area of the fingertip image is greater than a maximum value of a preset range. If yes, the control terminal obtains a curvature jumping point of the fingertip image according to a quasi-circular feature of the fingertip image, performing an image segmentation on the fingertip image according to the curvature jumping point to acquire a target image having a continuous arc, replacing the fingertip mage with the target image. If no, the control terminal determines a button value input at the virtual operating interface by the user according to the fingertip image.

In this embodiment, since the fingertips of different users may have different sizes, the number of the pixels of different fingertip images may thus be different. In the prior art, whether the fingertip image currently extracted is a single fingertip image is determined as follows. The number of the pixels of the fingertip image is calculated to determine the area of the fingertip image. When the number falls within a preset range, the fingertip image currently extracted is determined as a single fingertip image. When the number is greater than a maximum value of the preset range, the fingertip image currently extracted is determined to include not only a single fingertip image but also images of the finger. Then, the curvature jumping point of the fingertip image is obtained according to the quasi-circular feature of the fingertip image, the fingertip image is divided according to the curvature jumping point to acquire a target image having a continuous arc, the fingertip image is replaced with the target image. In this embodiment, since the effectiveness of the fingertip image is determined, the accuracy of the input of remote commands can be further improved.

It is notable that the way to determine the button value input at the virtual operating interface by the user according to the fingertip image can be varied according to need. For example, the button value input can be determined according to the coordinate of the center point of the fingertip image, and also can be determined according to the area covered by the whole fingertip image. In this embodiment, the control terminal first calculates the coordinate of the center point of the fingertip image, and determines the button value input at the virtual operating interface by the user according to the coordinate of the center point.

For example, the coordinate of the center point of the fingertip image is denoted as $$(\overline{x_n}, \overline{y_n}), \overline{x_n} = \sum_{x \in R} i_n(x)/N, \overline{y_n} = \sum_{y \in R} i_n(y)/N,$$

herein in $i_n(x)$ and $i_n(y)$ denote the coordinates of the fingertip image along "x" axis and "y" axis, respectively, R denotes a coordinate collection (x, y) including coordinates within the fingertip image, and N denotes the number of the pixels of the fingertip image. The virtual button corresponding to the coordinate $(\overline{x_n}, \overline{y_n})$ is determined, and thus the button value input by the user is then determined.

Furthermore, the control terminal further detects in real-time whether a moving distance of the control terminal is greater than a second preset value. If yes, the control terminal projects a corresponding virtual operating interface according to the voice command.

In this embodiment, when the projecting device projects the virtual operating interface, the control terminal turns off the camera and resets the projecting device if the control terminal moves. The control terminal can move an empirical distance (that is, the second preset value). Only when the user wearing the control terminal moves a distance greater than the empirical distance can the projecting device be reset, thereby preventing the control terminal from resetting the projecting device when the user only shakes slightly.

The order of the above embodiments is just used for better describing the embodiments, but does not represents which one is better. Through the above described embodiments, those persons skilled in the art may clearly understand that the above-described embodiments may be implemented by software combined with a necessary universal hardware platform, of course, may also be implemented only by hardware. However, in many cases, the former is a better embodiment. Based on this understanding, the present disclosure, particularly the part of it which makes a contribution to the prior art, may be presented as a software product. The computer software product is stored in a storage medium (such as ROM/RAM, disk, CD), including a number of instructions to instruct a terminal device (may be a cell phone, a computer, a server, or a network equipment) to perform the embodiments described in the present disclosure.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A remote control method for virtual operating interface, comprising:
   a to-be-controlled terminal obtaining a voice command according to a voice signal input by a user and sending the voice command to a control terminal; wherein the voice command corresponds to a preset virtual operating interface;
   the control terminal projecting a corresponding virtual operating interface according to the voice command;
   the control terminal collecting a graphic image formed by the virtual operating interface at preset time intervals;
   the control terminal determining a remote command corresponding to a location within the virtual operating interface at which a fingertip of the user keeps operating according to the collected graphic image, and sending the remote command to the to-be-controlled terminal, thereby controlling the to-be-controlled terminal to perform corresponding remote operations;
   wherein the operation of the control terminal determining a remote command corresponding to a location within the virtual operating interface at which a fingertip of the user keeps operating according to the collected graphic image, and sending the remote command to the to-be-controlled terminal, thereby controlling the to-be-controlled terminal to perform corresponding remote operations comprises:
   the control terminal obtaining a first frame of image of the virtual operating interface when the projecting device projects the virtual operating interface, and setting the first frame of image as a template image;

the control terminal determining whether an absolute difference between a pixel value of the collected graphic image formed by the virtual operating interface successively collected at preset time intervals and a pixel value of the template image is greater than a first preset value;

the control terminal extracting a fingertip image within the currently collected graphic image if the absolute difference is greater than the first preset value;

the control terminal determining a button value input at the virtual operating interface by the user according to the fingertip image; and the control terminal sending the remote command to the to-be-controlled terminal according to the button value input, thereby controlling the to-be-controlled terminal to perform the corresponding remote operations;

wherein the operation of the control terminal extracting a fingertip image within the currently collected graphic image further comprises:

calculating an area of the fingertip image;

determining whether an area of the fingertip image is greater than a maximum value of a preset range;

obtaining a curvature jumping point in the fingertip image according to a quasi-circular feature of the fingertip image if the area is greater than the maximum value, performing an image segmentation on the fingertip image according to the curvature jumping point to acquire a target image having a continuous arc, and replacing the fingertip mage with the target image; and returning to the operation of determining the button value input at the virtual operating interface by the user according to the fingertip image, if the area is not greater than the maximum value.

2. The remote control method of claim 1, wherein the step of "determining a button value input at the virtual operating interface by the user according to the fingertip image" further comprises:

calculating a coordinate of a center point of the fingertip image; and determining the button value input at the virtual operating interface by the user according to the coordinate of the center point.

3. The remote control method of claim 1, wherein the step of "the control terminal projecting a corresponding virtual operating interface according to the voice command" further comprises:

the control terminal detecting in real-time whether a moving distance of the control terminal is greater than a second preset value; and the control terminal projecting a corresponding virtual operating interface according to the voice command if the moving distance is greater than the second preset value.

4. A remote control system for virtual operating interface comprising:

a to-be-controlled terminal; and a control terminal;

wherein the to-be-controlled terminal is configured to obtain a voice command according to a voice signal input by a user and send the voice command to a control terminal; wherein the voice command corresponds to a preset virtual operating interface;

wherein the control terminal is configured to:

project a corresponding virtual operating interface according to the voice command;

collect a graphic image formed by the virtual operating interface at preset time intervals;

determine a remote command corresponding to a location within the virtual operating interface at which a fingertip of the user keeps operating according to the collected graphic image; and send the remote command to the to-be-controlled terminal, thereby controlling the to-be-controlled terminal to perform corresponding remote operations;

wherein when the projecting device projects the virtual operating interface, the control terminal is further configured to:

obtain a first frame of image of the virtual operating interface, and set the first frame of image as a template image;

determine whether an absolute difference between a pixel value of the collected graphic image formed by the virtual operating interface successively collected at preset time intervals and a pixel value of the template image is greater than a first preset value;

extract a fingertip image within the currently collected graphic image if the absolute difference is greater than the first preset value;

determine a button value input at the virtual operating interface by the user according to the fingertip image; and send the remote command to the to-be-controlled terminal according to the button value input, thereby controlling the to-be-controlled terminal to perform the corresponding remote operations;

wherein the control terminal is further configured to:

calculate an area of the fingertip image;

determine whether an area of the fingertip image is greater than a maximum value of a preset range;

obtain a curvature jumping point at which a curvature jumps in the fingertip image according to a quasi-circular feature of the fingertip image if the area is greater than the maximum value, perform an image segmentation on the fingertip image according to the curvature jumping point to acquire a target image having a continuous arc, replace the fingertip mage with the target image; and return to the operation of determining the button value input at the virtual operating interface by the user according to the fingertip image, if the area is not greater than the maximum value.

5. The remote control system of claim 4, wherein the control terminal is further configured to:

calculate a coordinate of a center point of the fingertip image; and determine the button value input at the virtual operating interface by the user according to the coordinate of the center point.

6. The remote control system of claim 4, wherein the control terminal is further configured to:

detect in real-time whether a moving distance of the control terminal is greater than a second preset value; and project a corresponding virtual operating interface according to the voice command if the moving distance is greater than the second preset value.

* * * * *